United States Patent
Park

(10) Patent No.: US 6,595,084 B2
(45) Date of Patent: *Jul. 22, 2003

(54) CONTINUOUSLY VARIABLY RECIPROCATING TRANSMISSION

(76) Inventor: Bret J. Park, 11179 South Ivy Creek Cove, South Jordan, UT (US) 84095

(*) Notice: Subject to any disclaimer, the term of this patent is extended or adjusted under 35 U.S.C. 154(b) by 0 days.

This patent is subject to a terminal disclaimer.

(21) Appl. No.: 09/753,157

(22) Filed: Jan. 2, 2001

(65) Prior Publication Data

US 2001/0001372 A1 May 24, 2001

Related U.S. Application Data

(63) Continuation-in-part of application No. 09/592,070, filed on Jun. 12, 2000, which is a continuation of application No. 09/419,858, filed on Oct. 19, 1999, which is a continuation of application No. 08/828,802, filed on Mar. 27, 1997, now Pat. No. 6,016,719.

(51) Int. Cl.[7] .............................. F16C 3/04; F16H 25/08
(52) U.S. Cl. .............................. 74/601; 74/55; 74/600; 74/837
(58) Field of Search .................... 74/601, 837, 600, 74/121, 123, 586, 44, 117, 119, 520

(56) References Cited

U.S. PATENT DOCUMENTS

| 286,596 A | 10/1883 | Ercanbrack |
| 403,637 A | 5/1889 | Bomm |
| 1,050,226 A | 1/1913 | Nixon |
| 1,063,839 A | 6/1913 | Smith |
| 1,183,380 A | 5/1916 | Holdt |
| 1,301,982 A | 4/1919 | Smith |
| 1,378,621 A | 5/1921 | Sabin |
| 1,489,014 A | 4/1924 | Shellenberger |
| 1,858,934 A | 5/1932 | Neurath |
| 1,909,831 A | 5/1933 | Jensen |
| 2,782,647 A | * 2/1957 | Wildhaber .................... 74/600 |
| 2,841,997 A | * 7/1958 | Maust .......................... 74/119 |
| 4,739,667 A | 4/1988 | Peterson |
| 5,392,664 A | 2/1995 | Gogins |

* cited by examiner

Primary Examiner—Marcus Charles
(74) Attorney, Agent, or Firm—Clayton, Howarth & Cannon, P.C.

(57) ABSTRACT

A variable-ratio transmission device. A first translational member is pivotally intercoupled to a first rotational member by at least one connecting arm. The connecting arm has a first portion pivotally connected to the first translational member at a first pivot point, and a second portion pivotally and adjustably connected to the first rotational member at a first radial attachment point removed from the center of rotation of the first rotational member. The first radial attachment point and the center of rotation thereby define a first attachment radius. The location of the first radial attachment point with respect to the first rotational member is variable to thereby increase and decrease the first attachment radius, which in turn modifies a ratio of movement between the first rotational member and the first translational member.

27 Claims, 5 Drawing Sheets

CONTINUOUSLY VARIABLY RECIPROCATING TRANSMISSION

CROSS-REFERENCE TO RELATED APPLICATIONS

This application is a continuation of co-pending U.S. patent application Ser. No. 09/592,070, filed Jun. 12, 2000, entitled "CONTINUOUSLY VARIABLE RECIPROCATING TRANSMISSION," which is hereby incorporated herein by reference in its entirety and which is a continuation of U.S. patent application Ser. No. 09/419,858, filed Oct. 19, 1999, entitled "CONTINUOUSLY VARIABLE RECIPROCATING TRANSMISSION DEVICE," which is hereby incorporated herein by reference in its entirety and which is a continuation of 08/828,802 now U.S. Pat. No. 6,016,719, filed Mar. 27, 1997, entitled "CONTINUOUSLY VARIABLE RECIPROCATING TRANSMISSION DEVICE," which is hereby incorporated herein by reference in its entirety.

STATEMENT REGARDING FEDERALLY SPONSORED RESEARCH OR DEVELOPMENT

Not applicable

BACKGROUND OF THE INVENTION

1. The Field of the Invention

The present invention relates generally to vehicle transmissions. More particularly, it concerns a variable-ratio transmission device.

2. Description of Related Art

Transmission devices are well known in the field of motorized vehicles for converting and transmitting the force generated by an engine to an output shaft. It is known to make efficient use of the motor power by adjusting the gear ratio between the input and output shafts responsive to variation in loads on the output shaft, or on the input shaft. For example, a higher gear ratio often provides a more efficient transfer of force for larger loads on the output shaft. Conversely, a lower gear ratio often suffices for lesser loads on the output shaft.

The need to optimize the motor power by varying the gear ratio has motivated the development of many different transmission devices capable of shifting between gear ratios. The standard transmission is known in the field to permit an operator to shift between various gear ratios by operating a hand-shift lever in conjunction with a foot clutch. Automatic transmissions have been developed which accomplish an automatic shifting between gear ratios responsive to increases and decreases in load on the output shaft.

Another approach to vehicle transmissions is the concept of a continuously variable transmission, which automakers have attempted for years to develop. It is thought that energy transfer between the motor and the output shaft can be further optimized by providing an infinite range of gear ratios between the minimum and maximum gear ratios, instead of merely four or five different gear ratios. This idea is a good one, since variation in load on the output shaft tends to increase and decrease gradually and continuously. Indeed, it stands to reason that provision of an optimal gear ratio for each and every load variation on the output shaft would maximize the efficiency of the vehicle. However, there have been many practical difficulties with the prior art transmission devices which offer continuously variable gear ratios.

There is thus a need for a variable-ratio transmission which is simple in design, manufacture and operation.

The prior art is thus characterized by several disadvantages that are addressed by the present invention. The present invention minimizes, and in some aspects eliminates, the above-mentioned failures, and other problems, by utilizing the methods and structural features described herein.

BRIEF SUMMARY AND OBJECTS OF THE INVENTION

It is therefore an object of the present invention to provide a variable-ratio transmission which is simple in design and operation.

It is another object of the invention, in accordance with one aspect thereof, to provide such a transmission capable of converting rotational motion to reciprocating, linear motion at variable ratios.

It is a further object of the invention, in accordance with one aspect thereof, to provide such a transmission capable of varying a ratio of movement between gear members during movement of said gear members.

The above objects and others not specifically recited are realized in a specific illustrative embodiment of a variable-ratio transmission device. A first translational member is pivotally intercoupled to a first rotational member by at least one connecting arm. The output member could be a gear, a piston, or any other suitable output member. The connecting arm has a first portion pivotally connected to the first translational member at a first pivot point, and a second portion pivotally and adjustably connected to the first rotational member at a first radial attachment point removed from the center of rotation of the first rotational member. The first radial attachment point and the center of rotation thereby define a first attachment radius. The location of the first radial attachment point with respect to the first rotational member is variable to thereby increase and decrease the first attachment radius, which in turn modifies a ratio of movement between the first rotational member and the first translational member.

Additional objects and advantages of the invention will be set forth in the description which follows, and in part will be apparent from the description, or may be learned by the practice of the invention without undue experimentation. The objects and advantages of the invention may be realized and obtained by means of the instruments and combinations particularly pointed out in the appended claims.

BRIEF DESCRIPTION OF THE DRAWINGS

The above and other objects, features and advantages of the invention will become apparent from a consideration of the subsequent detailed description presented in connection with the accompanying drawings in which.

The above and other objects, features and advantages of the invention will become apparent from a consideration of the subsequent detailed description presented in connection with the accompanying drawings in which.

DETAILED DESCRIPTION OF THE INVENTION

Figure 1:
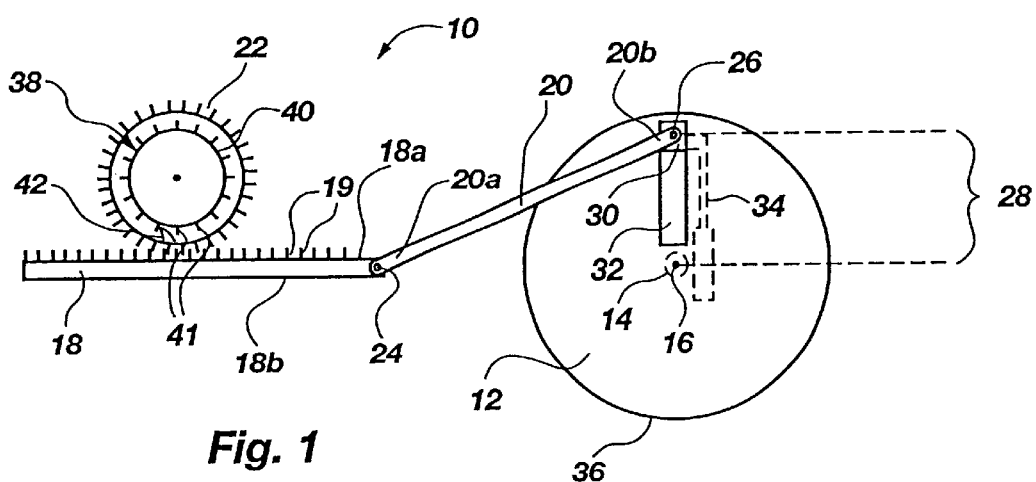
FIG. 1 is a side, schematic view of a variable-ratio transmission, made in accordance with the principles of the present invention.

For the purposes of promoting an understanding of the principles in accordance with the invention, reference will now be made to the embodiments illustrated in the drawings and specific language will be used to describe the same. It will nevertheless be understood that no limitation of the scope of the invention is thereby intended. Any alterations and further modifications of the inventive features illustrated herein, and any additional applications of the principles of the invention as illustrated herein, which would normally occur to one skilled in the relevant art and having possession of this disclosure, are to be considered within the scope of the invention claimed.

For the purposes of promoting an understanding of the principles in accordance with the invention, reference will now be made to the embodiments illustrated in the drawings and specific language will be used to describe the same. It will nevertheless be understood that no limitation of the scope of the invention is thereby intended. Any alterations and further modifications of the illustrated apparatus, and any additional applications of the principles of the invention as illustrated herein, which would normally occur to one skilled in the relevant art and possessed of this disclosure, are to be considered within the scope of the invention claimed.

Applicant has discovered a new design for a variable-ratio transmission device capable of transmitting force while varying gear ratios during movement of the gears. In FIG. 1 is shown a transmission device, designated generally at 10. The transmission 10 includes a first rotational member 12, configured for attachment to a means 14, which could be an input shaft, for rotating said first rotational member 12 about a center of rotation 16. Of course, any suitable means known in the art for rotating the first rotational member 12 could be used, including belts or gears. A first translational member 18 is intercoupled to the first rotational member 12 by a connecting arm 20, and is configured for transmitting force to an output gear 22 that is disposed in meshing engagement with said first translational member 18.

Figure 2:
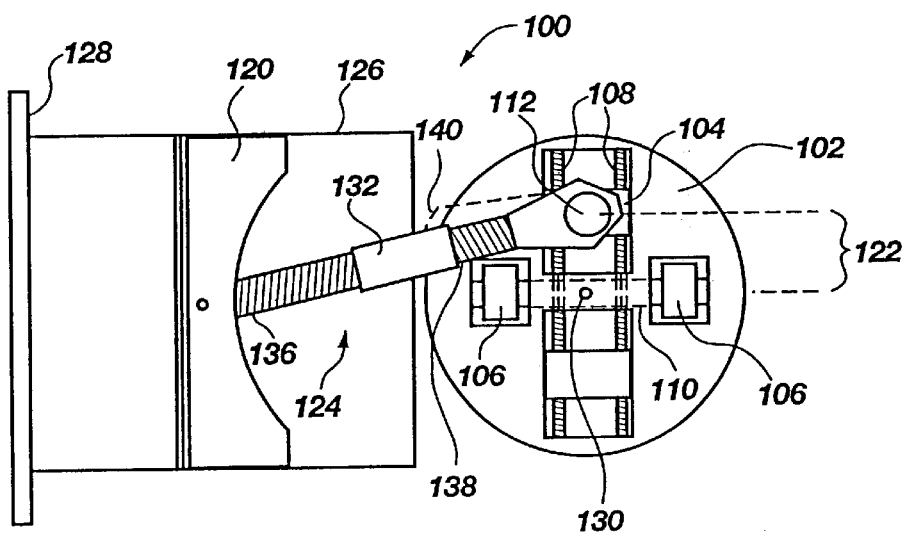
FIG. 2 is a side, schematic view of an alternative embodiment of the variable-ratio transmission of FIG. 1.

In operation, an input force operates to rotate the first rotational member 12, which causes translational output movement in the first translational member 18. Alternatively, an input force F may instead be applied to the translational member 18 to cause rotational output movement in the first rotational member 12, as illustrated in FIG. 2, and explained below in more detail. It is further to be understood that the first rotational member 12 may comprise a crank arm instead of a disc-like member, or any other suitable rotational member.

The connecting arm 20 has a first portion 20a pivotally connected to the first translational member 18 at a first pivot point 24, and a second portion 20b pivotally and adjustably connected to the first rotational member 12 at a first radial attachment point 26 removed from the center of rotation 16 of the first rotational member 12. The first radial attachment point 26 and the center of rotation 16 thereby define a first attachment radius 28. The location of the first radial attachment point 26 with respect to the first rotational member 12 is variable to thereby increase and decrease the first attachment radius 28, which in turn modifies a ratio of movement between the first rotational member 12 and the first translational member 18.

The ratio of movement between the first rotational member 12 and the translation member 18 is a gear ratio that can be varied by moving the first radial attachment point 26 toward and away from the center of rotation 16 of the first rotational member 12.

Any suitable adjusting means may be used for varying a location of the first radial attachment point 26 with respect to the first rotational member 12 to thereby increase and decrease the first attachment radius 28. For example the adjusting means may include a moveable portion 30 slidably disposed within a slot 32, with the second portion 20b of the connecting arm 20 being pivotally connected to said moveable portion 30, and a moving means 34 for moving said moveable portion 30 within the slot 32. The moving means 34 could comprise a suitable hydraulic cylinder, for example. The adjusting means is preferably designed to vary the location of the first radial attachment point 26 during rotation of the first rotational member 12, in accordance with any suitable method or design known to those of ordinary skill in the relevant art.

It is thus appreciated that movement of the first translational member 18 and movement of the first rotational member 12 define a first ratio of movement of said first rotational member 12 to said first translational member 18. The adjusting means described above may constitute a means for varying the location of the first radial attachment point 26, without varying a location of the first pivot point 24 relative to the first translational member 18, to thereby change the first ratio of movement to a second ratio of movement.

The adjusting means thus comprises a means for continuously varying the location of the first radial attachment point 26 to thereby continuously vary a first ratio of movement of the first rotational member 12 to the first translational member 18. The translational member 18 preferably comprises an elongate rack gear having gear teeth 19 arranged in a substantial linear orientation. More preferably, the rack gear 18 comprises a first side 18a and an opposing second side 18b, and wherein the gear teeth 19 extend outwardly from the first side 18a such that the second side 18b is characterized by an absence of gear teeth.

The first rotational member 12 further includes a perimeter 36 defining an interior area. For example, as shown in FIG. 1, the interior area includes the area circumscribed by perimeter 36. Preferably, less than a majority of the interior area defined by the perimeter 36 comprises an opening. For example, in FIG. 1 the slot 32 could be the only opening in the rotational member 12, and it constitutes less than a majority of the interior area defined by the perimeter 36.

The output gear 22 constitutes a rotational member. The transmission 10 may further include unidirectional clutch means 38 for (i) engaging the output gear 22 in rotational movement when the first rotational member 12 rotates in a first rotational direction and (ii) releasing the output gear 22 from engagement in rotational movement when said first rotational member 12 rotates in a second, opposing rotational direction.

The unidirectional clutch means 38 may be designed in any suitable manner, and is depicted schematically in FIG.

1 as an inner gear 40 concentrically disposed within the output gear 22. The inner gear 40 is rotatably disposed with respect to the output gear 22, and a clutch piece 42 is coupled to an inner portion of the output gear 22. Inspection of FIG. 1 illustrates that rotational movement of the first rotational member 12 causes a reciprocating, linear back-and-forth movement of the first translational member 18, which in turn causes a reciprocating rotational movement of the output gear 22. The clutch piece 42 is designed and positioned such that when the output gear 22 rotates clockwise, the clutch piece engages against one of gear teeth 41 of the inner gear 40 to cause rotational movement of the inner gear 40 in tandem with the output gear 22. Conversely, when the output gear 22 rotates counterclockwise, the clutch piece 42 passes over the gear teeth 41, thereby releasing inner gear 40 from engagement in rotational movement in tandem with the output gear 22.

Figure 3:
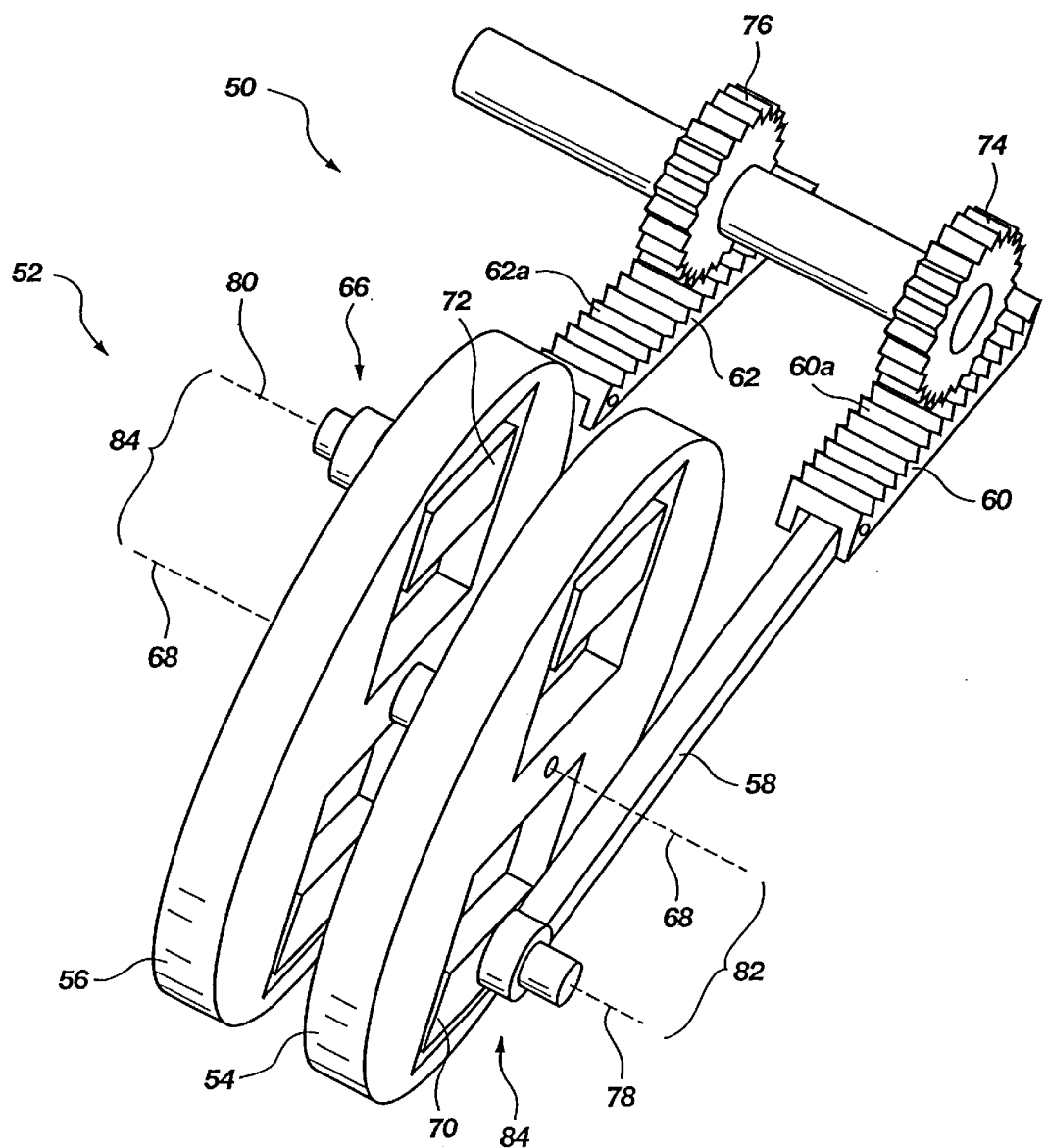
FIG. 3 is a perspective view of an alternative embodiment of the variable-ratio transmission of FIG. 1.

In FIG. 3 is shown an alternative embodiment of a transmission, designated generally at 50. A principal aspect of the transmission 50 of FIG. 3, as distinguished from the transmission 10 of FIG. 1, is the additional of one or more rotational members. The transmission 50 of FIG. 3 depicts two fixedly attached rotational members 54 and 56, with corresponding connecting arms and translational members 60 and 62. It is to be understood that an suitable number of rotational members and corresponding connecting arms and translational members may be interconnected in the manner of FIG. 3.

Accordingly, the transmission 50 of FIG. 3 may be described as having two rotational members 54 and 56. Alternatively, this structural arrangement could be described as a first rotational member designated generally at 52 having a first side 54 and an opposing second side 56. A first connecting arm 58 is pivotally connected to the first side 54 and to a first translational member 60. A second connecting arm (residing behind the second side 56, and therefore not shown) is preferably identical to the first connecting arm 58 and includes a first portion pivotally connected to the second translational member 62 and a second portion pivotally connected to the second side 56 of the first rotational member 52. The first and second translation members 60 and 62 include gear teeth 60a and 62a disposed in meshing engagement with first and second output gears 74 and 76, respectively.

The transmission 50 could thus be described as two of the transmission 10 of FIG. 1, connected together. The first connecting arm 58 is pivotally attached at a first radial attachment point 64, and the second connecting arm (not shown in FIG. 3 because it resides behind the second side 56 in that view) is pivotally attached at a second radial attachment point 66. Both radial attachment points 64 and 66 are removed from the center of rotation 68 of the first rotational member 52, such that said first and second radial attachment points 64 and 66 define a first and a second attachment radius, respectively, with the center of rotation 68.

The radial attachment points 64 and 66 are preferably disposed on moveable portions 70 and 72, respectively. Movement of the portions 70 and 72 operate to vary a location of the first and second radial attachment points 64 and 66 to thereby increase and decrease the first and second attachment radii, respectively. For example, the moveable portions 70 and 72 may be designed and operable similar to the workings of the transmission depicted in FIG. 2, as explained below in more detail.

The first and second output gears 74 and 76 constitute a second rotational member and a third rotational member, respectively, by reference to the first rotational member 52. The transmission 50 may further comprise unidirectional clutch means identical in structure and operation to the unidirectional clutch means 38 of FIG. 1, for (i) engaging the first output gear 74 in rotational movement when the first rotational member 52 rotates in a first rotational direction and (ii) releasing the first output gear 74 from engagement with the first rotational member 52 when said first rotational member 52 rotates in a second, opposing rotational direction, and (iii) engaging the second output gear 76 in rotational movement when the first rotational member 52 rotates in the second, opposing rotational direction and (iv) releasing the second output gear 76 from engagement with the first rotational member 52 when said first rotational member 52 rotates in the first rotational direction.

It will be appreciated that the first and second radial attachment points 64 and 66 may be diametrically positioned to cause the first and second translational members 60 and 62 to move in opposing directions. Further, the first and second radial attachment points 64 and 66 define a first pivot axis 78 and a second pivot axis 80, respectively, and the center of rotation 68 of the first rotational member 52 defines a center axis.

Positioning of the first pivot axis 78, second pivot axis 80 and center axis 68 is such that the first pivot axis 78 and the second pivot axis 80 are offset from the center axis 68 by a first and second radial distance 82 and 84, respectively, and such that a first line connecting the first pivot axis 78 with the center axis 68 and a second line connecting the second pivot axis 80 with the center axis 68 preferably define an approximately 180. degree. angle about said center axis 68, such that said positioning cooperates with the unidirectional clutch means to cause reciprocating, back-and-forth rotational movement of the first output gear 74 and reciprocating, back-and-forth rotational movement of the second output gear 76 opposite in direction to the rotational movement of the first output gear 74. Preferably, an adjusting means would include the moveable pieces 70 and 72 and would be designed to maintain the first radial distance 82 substantially equivalent to the second radial distance 84.

Figure 2A:
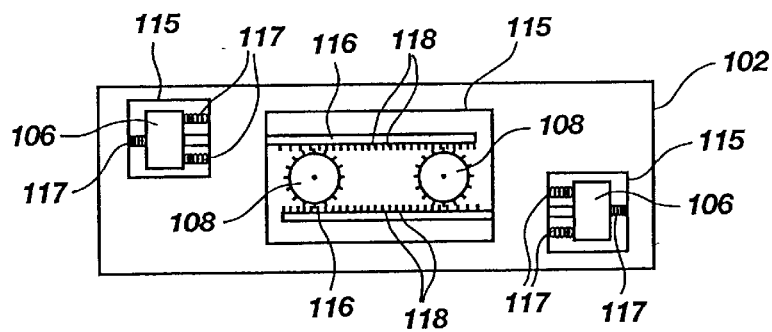
FIG. 2A is a plan, schematic view of a first rotational member of the transmission of FIG. 2.

Referring now to FIG. 2, there is shown a further embodiment of a transmission, designated generally at 100, and a more detailed view of a first rotational member 102 thereof is illustrated in FIG. 2A. Openings 115 in the first rotational member 102 are provided solely to illustrate some interior features purposes, and it is contemplated that such openings 115 would not exist in a working embodiment.

The transmission 100 embodies an adjusting means that may also be utilized in conjunction with the transmission 10 of FIG. 1, or with the transmission 50 of FIG. 3, or with any suitable embodiment of a transmission device. The first rotational member 102 includes a movement piece 104 having one or more female-threaded throughpassages formed therein. The adjusting means includes a mass means 106 movably disposed on the first rotational member 102 for moving radially outwardly and inwardly along said first rotational member 102. Male-threaded members 108 are rotatably disposed on the first rotational member 102 and extend through the female-threaded throughpassages of the movement piece 104 in threaded engagement therewith.

An actuating means 110 is provided for rotating the male-threaded members 108 responsive to radially-directed movement of the mass means 106 along the first rotational member 102, to thereby cause dynamic thread-to-thread engagement of said male-threaded members 108 with female threads of the female-threaded throughpassages of the movement piece 104 sufficient to cause radially-directed movement of the movement pieces 108 along the first rotational member 102, which causes variation in the location of a first radial attachment point 112 with respect to the first rotational member 102.

The actuating means 110 includes gear teeth 114 (FIG. 2A) formed on the male-threaded members 108. Gear bodies 116 are coupled to the mass means 106 and extend outwardly therefrom. The gear body 116 has gear teeth 118 disposed in meshing engagement with the gear teeth 114 on the male-threaded members 108. In accordance with one aspect of the invention, mass means 106 are slidably disposed in any suitable manner on, or within, the first rotational member 102. As the first rotational member 102 rotates, centrifugal force operates to drive the mass means 106 radially outwardly, thereby pulling the gear bodies 116 and rotating the male-threaded members 108 through meshing engagement between the gear teeth 114 and 118. The rotation of the male-threaded members 108 operates to move the moveable piece 104 through threaded engagement.

It will be appreciated that a spring force is preferably imposed upon the mass means 106, which operates as a kind of force cushion against movement of the mass means 106. As shown in FIG. 2A, spring means 117 are applied to opposing sides of each mass means 106. As centrifugal force is applied to the mass means 106, they are thereby driven radially outwardly against the force of the spring means 117. The spring means 117 may comprise any suitable spring force means, including mechanical springs, gas springs, or otherwise.

The actuating means 110 is designed such that (i) the faster the rotational velocity, the more the centrifugal force and the farther the mass means 106 are driven radially outwardly, and conversely (ii) the slower the rotational velocity, the less the centrifugal force, and the less radially outwardly the mass means 106 are driven.

It is thus contemplated that the first rotational member 102 might be disposed in a constant rotational velocity, at which time the mass means 106 would be thrust radially outwardly to a certain point of equilibrium. If the rotational velocity of the first rotational member 102 increases, the mass means 106 would be driven even further outwardly, while a decrease in rotational velocity would cause a radially inward retreat of the mass means 106.

As the mass means 106 are driven outwardly, corresponding movement in the gear bodies 116 operates to rotate the male-threaded members 108, thereby moving radially outwardly the moveable piece 104 because of threaded engagement between the male-threaded members 108 and the moveable piece 104. As rotational velocity increases, so does a radius of attachment 122, which causes the ratio of movement of the first rotational member 102 to a translational member 120 to increase. As rotational velocity decreases, the radius of attachment 122 also decreases, as does the ratio of movement.

Referring still to FIGS. 2 and 2A, the transmission 100 further comprises lengthening means 132 for varying a length of connecting arm 124.

Accordingly, the adjusting means further comprises any suitable means 132 for varying the length of the connecting arm 124 sufficient to maintain the distal position (part A) of the cycle of reciprocating linear movement in substantially the same location with respect to a fixed reference. The means 132 comprises a female-threaded sleeve which threadably engages with, and thereby intercouples together, male-threaded portions 136 and 138 of the connecting arm 124. A lengthening device 140 is represented schematically in FIG. 2, and may comprise any suitable means for rotating the sleeve 132 responsive to movement of the moveable piece 104 relative to the first rotational member 102, to (i) increase the length of the connecting arm 124 when the radius of attachment 122 decreases, or (ii) decrease the length of the connecting arm 124 when the radius of attachment 122 increases, to thereby maintain the distal-most position of surface 120 at a consistent position.

In accordance with the principles of the present invention, one preferred method for transmitting force among gear members and varying a gear ratio of movement said gear members comprises the steps of:

(a) pivotally connecting a first portion of a connecting arm to a first translational member at a first pivot point, and pivotally connecting a second portion of the connecting arm to a first rotational member at a first radial attachment point removed from a center of rotation of the first rotational member such that said first radial attachment point and said center of rotation define a first attachment radius, such that dynamic force from rotational movement of the first rotational member is transmitted by the connecting arm to the first translational member; and (b) varying a location of the first radial attachment point with respect to the first rotational member to thereby increase and decrease the first attachment radius and change a first ratio of movement of said first rotational member to the first translational member.

Figure 4:
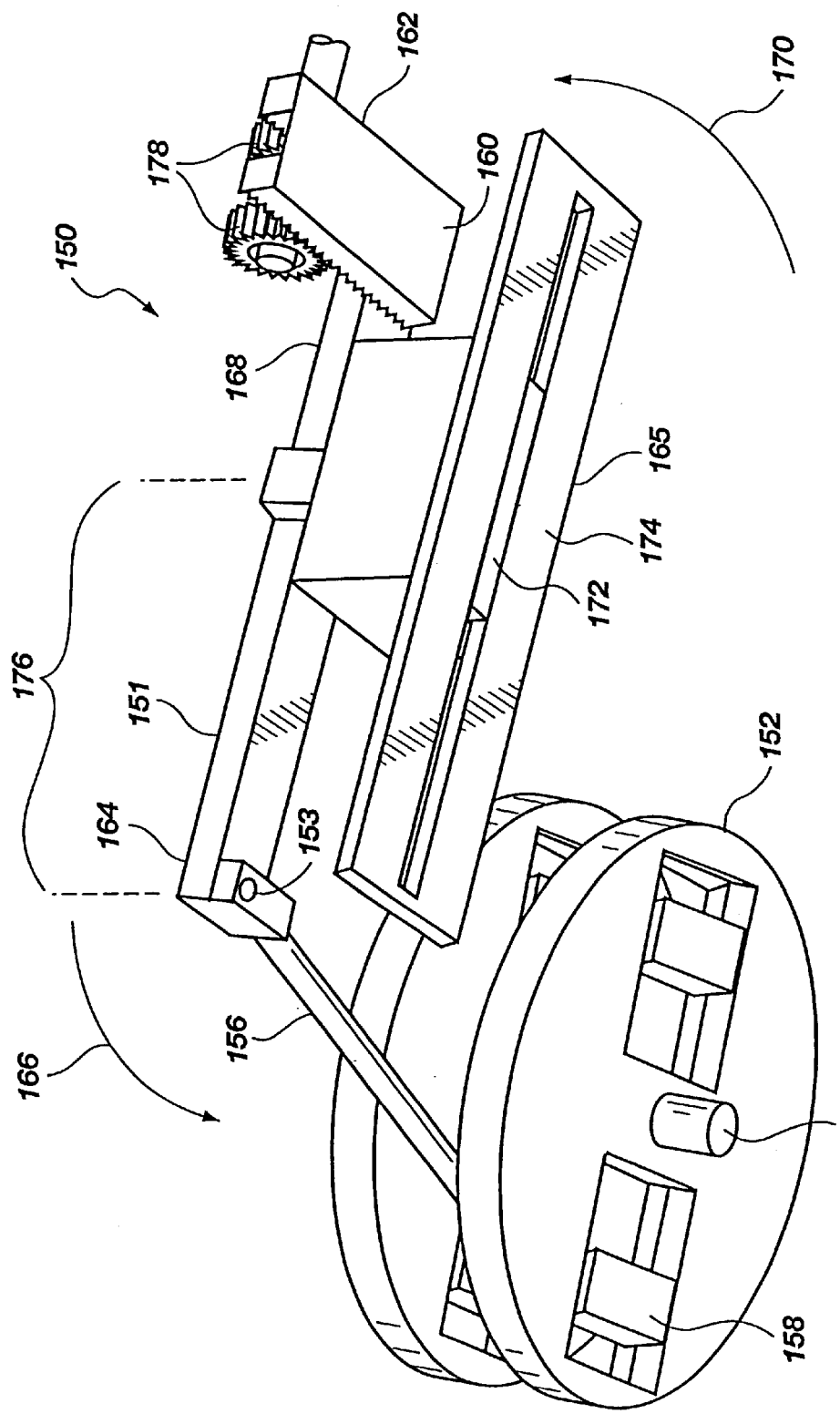
FIG. 4 is a perspective view of a further alternative embodiment of the variable-ratio transmission of FIG. 1.

Referring now to FIG. 4, there is shown a further alternative embodiment of a transmission device, designated generally at 150, which includes a first rotational member 152 having a center of rotation 154. The transmission 150 differs from that of FIGS. 1–3 by provision of a second connecting arm 151. The second connecting arm 151 is pivotally connected at 153 to a first connecting arm 156, which is in turn pivotally connected to a movement piece 158 at a radial attachment point. Movement of the movement piece 158 may be accomplished in any suitable manner, preferably in the manner described in conjunction with item 30 of FIG. 1, or item 104 of FIG. 2.

The second connecting arm 151 is slidably attached at item 160 to a first translational member 162, and an interior portion 165 of the second connecting arm 151 is pivotally attached to a fulcrum point 172. In this manner, movement of a first portion 164 of the second connecting arm 151 in a first direction 166 causes corresponding movement of a second portion 166 of said second connecting arm 151 in a second, opposing direction 170.

It will be appreciated that the second connecting arm 151 is an elongate member defining an axial direction, and that the fulcrum concept may include a means 174 for moving the fulcrum point 172 along the axial direction of the second connecting arm 151 to thereby modify a range of movement of said second connecting arm. A radius of influence 176 is defined between the fulcrum point 172 and the pivot connection 153 between the first and second connecting arms 156 and 151. For example, if the fulcrum point 172 is moved so as to decrease the radius of influence 176, the range of movement of the second portion 168 increases, and vice versa. The means 174 for moving the fulcrum point 172 may be designed and operated in any suitable manner.

It may thus be understood that the range of movement of the second portion 168 of the second connecting arm 151 may be influenced solely by manipulation of the fulcrum point 172, and the movement piece 158 may therefore remain intact in a relatively fixed position. Of course, the movement piece 158 may also be moved to increase and decrease the radius of attachment for further modification of the position and range of movement of the second connecting arm 151, and thus the first translational member 162. The first translational member 162 may engage gear members 178 as shown, or may alternatively be designed in any other suitable manner.

In accordance with the above, the first connecting arm 20 of FIG. 1, as well as the first and second connecting arms 156 and 151 and fulcrum point 172 of FIG. 4, may both be described as a connecting means for operatively connecting the first rotational member and the first translational member such that movement of one of said translational member and rotational member causes movement of the other of said translational member and rotational member, wherein the connecting means comprises a first connecting arm having a first portion, and a second portion pivotally connected to the first rotational member, and a second connecting arm having a first portion pivotally connecting to the first portion of the first connecting arm, and an opposing second portion slidably connected to the first translational member.

Figure 5:
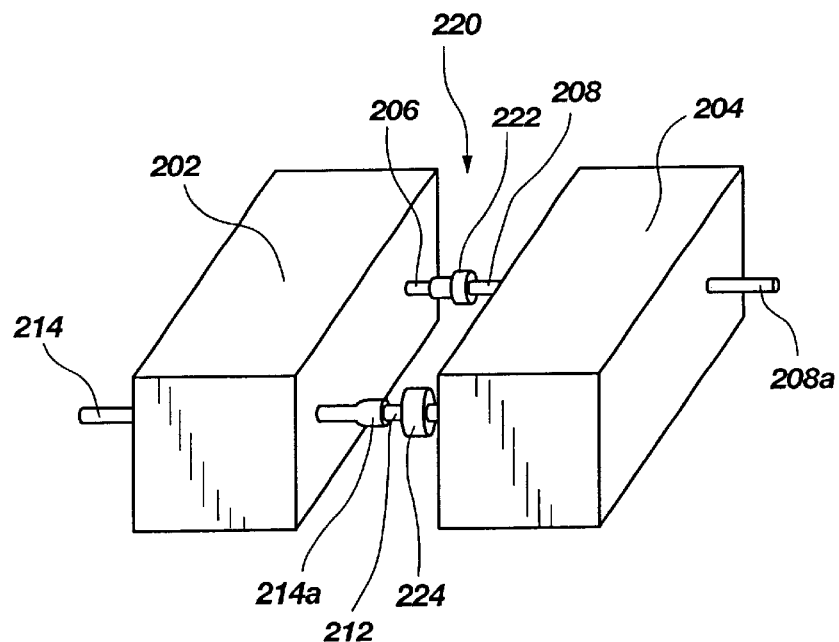
FIG. 5 is a perspective view of a compression braking device, made in accordance with the principles of the present invention.
Figure 6:
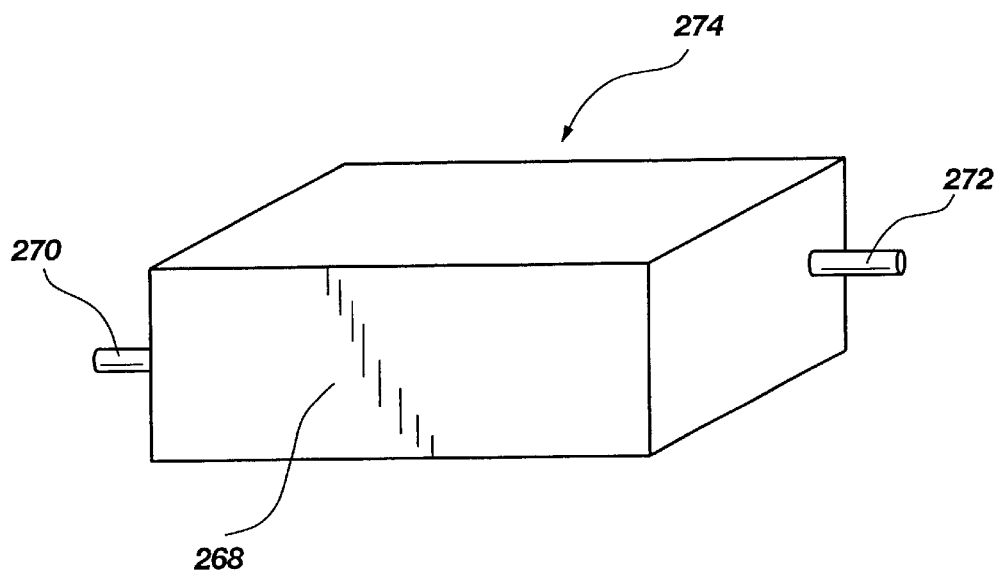
FIG. 6 is an exterior, perspective view of a further alternative embodiment, of the compression braking device, shown in a single housing.
Figure 7:
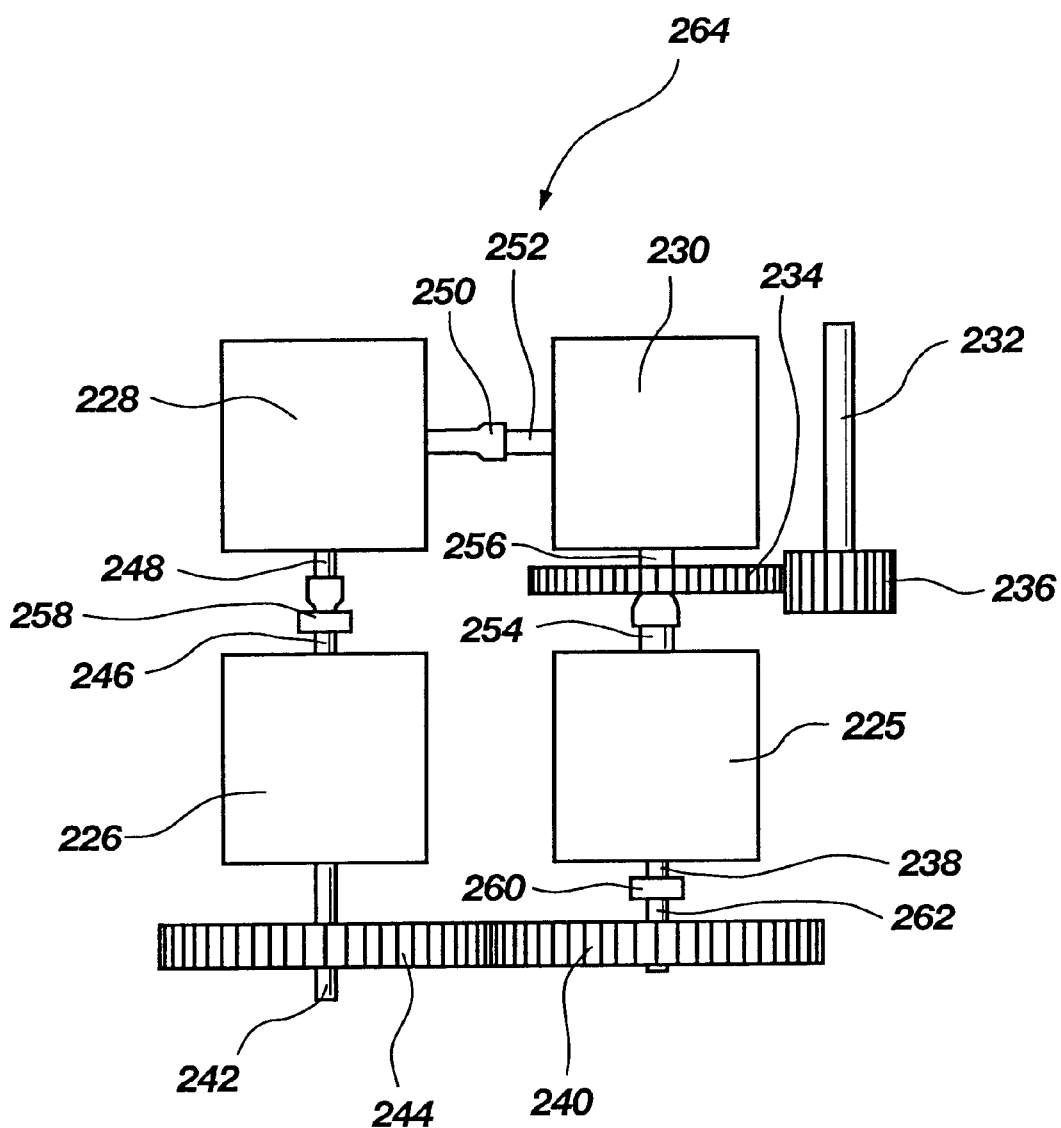
FIG. 7 is a top schematic view of a further alternative embodiment, of the compression braking device, utilizing four separate transmissions.

Referring now to FIGS. 5–7, Applicant has discovered a new design for a compression braking device capable of decelerating a vehicle in motion. In FIG. 5 is shown a compression braking device, designated generally at 220. The compression device 220 includes a first transmission 202 which can be any manner of transmission capable of shifting gear ratios. Transmission 202 has an input shaft 214 and an output shaft 206 capable of transmitting torsional force through transmission 202 generally to accomplish different gear ratios between input shaft 214 and output shaft 206, these transmission means are known to those skilled in the art. Output shaft 206 is then connected to unidirectional clutch 222 which is connected to input shaft 208 of transmission 204 in such a manner to allow torsional force to be transmitted from output shaft 222 to input shaft 208 of transmission 204 in a single direction. Transmission 204 can also be any manner of transmission capable of shifting gear ratios. Transmission 204 has an input shaft 208 and an output shaft 212 capable of transmitting torsional force through transmission 204 generally to accomplish different gear ratios. Output shaft 212 is connected to a unidirectional clutch 224 which is connected to input shaft 214a in such a manner to allow torsional force to be transmitted from output shaft 212 to input shaft 214a in a single direction, which in FIG. 5 is the opposite end of input shaft 214, but shaft 214a can simply be connected to input shaft 214 by other means also. Output/input shaft 208a is also the other end of shaft 208, or can be connected in some manner to input shaft 208. Output/input shaft 208a is generally connected to the driven member of the vehicle this device is in, while input shaft 214 is generally connected to the driving member, or engine of the vehicle.

In operation, torsional force can be applied to the input shaft 214, or to output/input shaft 208a. When input torsional force rotates the first input shaft 214, rotational output movement of output shaft 206 through transmission 202 occurs, which in turn causes torsional force to travel through clutch 222 to input shaft 208 of transmission 204, forcing input shaft 208 to rotate. Input shaft 208 then transmits rotational force through transmission 204 to both output shaft 208a, and output shaft 212. Shaft 208a is generally connected in some manner to a driven device, while output shaft 212 is connected either directly or indirectly to input shaft 214a, generally through unidirectional clutch 224. Output shaft 212 transfers power through these means back into transmission 202 through input shaft 214a, while rotational force is also being transferred simultaneously through output shaft 208a, which is generally the overall output shaft of compression braking transmission device 220. For example if this transmission were to be used in an automobile, the engine would generally turn input shaft 214, and output shaft 208a would generally turn the wheels (either directly or indirectly). While power is being supplied to input shaft 214, transmissions 202 and 204 should operate in a certain balance with each other, or transmission 204 can even be allowed to freewheel, by means of the unidirectional clutches, which will be described later in this description.

In the reverse operation, this compression braking device operates by receiving rotational input force through output/input shaft 208a, which causes rotational output of output shaft 212, which transfers rotational force through clutch 224 causing input shaft 214a to rotate, forcing the rotation of input shaft 214. The reverse operation of this device causes compression braking to occur, if an engine is attached to input shaft 214 (either directly or indirectly), and if output/input shaft 208a is attached to a driven device, such as an automobile. If the automobile engine was attached in some manner to shaft 214 to allow transmission of torsional force, and the wheels of the automobile were attached in some manner to shaft 208a to also allow torsional force transmission. During acceleration of the automobile the rotational force would simply travel through transmission 202 as described earlier into transmission 204 also described earlier, and then through transmission 204 to shaft 208a, which would transfer rotational force to the wheels of the automobile, directly or indirectly. During deceleration, the wheels would then cause shaft 208a to be rotated, causing rotational force to go through transmission 204 to output shaft 212, transferring rotational force through clutch 224, and through input shaft 214a, to input shaft 214, which would then transmit this torsional force back into the engine, forcing the engine to turn at some given revolutions per minute (r.p.m.), which is faster than the engine would otherwise be turning the transmission at the given time. Because the engine is being forced to turn at this higher r.p.m., the engine creates drag, (a term known to those skilled in the art) which causes the vehicle to slow down. In other words the compression, friction, and/or other forces in the engine are causing the automobile to decelerate, or creating compression braking.

The two unidirectional clutches 222 and 224 are used to allow freewheeling of the transmissions when needed. During acceleration clutch 224 would allow shaft 214a to freewheel, while during deceleration clutch 222 would allow shaft 208 to freewheel if necessary.

It should also be understood that although the transmissions 202 and 204 operate together to create a single compression braking transmission device, three or more transmissions could function together to perform this same task, as shown in FIG. 7. FIG. 7 shows four transmissions 225, 226, 228, and 230 connected to each other by their input and output shafts to form a single compression braking device.

Transmissions 225, 226, 228, and 230 are all transmissions capable of individually changing gear ratios between their input shafts and output shafts. Transmission 226 has an input shaft 242 and an output shaft 246 capable of transmitting torsional force through transmission 226 generally to accomplish different gear ratios between input shaft 242 and output shaft 246, these transmission means are known to those skilled in the art. Output shaft 246 is then connected to unidirectional clutch 258 which is connected to input shaft 248 of transmission 228 in such a manner to allow torsional force to be transmitted from output shaft 246 to input shaft 248 of transmission 228. It should be noted that these unidirectional clutches can be placed between the input and output shafts of any of the transmissions. Transmission 228 can also be any manner of transmission capable of shifting gear ratios. Transmission 228 has an input shaft 248 and an output shaft 250 capable of transmitting torsional force through transmission 228 generally to accomplish different gear ratios between input shaft 248, and output shaft 250. Output shaft 250 is then connected to input 252 by means which allow the transfer of torsional force from shaft 250 to shaft 252. Transmission 230 is also any manner of transmission capable of shifting gear ratios between input shaft 252, and output shaft 256. Output shaft 256 of transmission 230 is then connected to input shaft 254 of transmission 225 in a similar means as shafts 250 and 252 were connected, to allow transfer of torsional force, from transmission 230 to transmission 225. On shaft 256 is mounted a spur gear 234 which is made to turn in conjunction with spur gear 236. Gear 236 is connected to output/input shaft 232. Shaft 232 is the final output shaft for compression braking device 264 during acceleration, while shaft 242 is the main input shaft of device 264 during acceleration.

It should be noted that the assembly 234, 236 and 232 can be placed between any two of the transmissions in the same manner it is placed between transmissions 230 and 225. For example assembly 234, 236 and 232, could be mounted onto output shaft 250, or onto output shaft 246.

Transmission 220 has input shaft 254 which is capable of transmitting torsional force through transmission 225 to accomplish different gear ratios between input shaft 254 and output shaft 238. Output shaft 238 is connected to a unidirectional clutch 260 in such a manner to allow torsional force to be transmitted through clutch 260 to shaft 262 in a single direction. Spur gear 240 is mounted on Shaft 262 and gear 240 is made to turn gear 244 which is mounted of input shaft 242.

Generally a type of engine will be connected in some manner to input shaft 242 to allow torsional force to be transmitted into this device 264, and in an automobile the wheels of the automobile will be connected in some manner directly or indirectly to output/input shaft 232.

In acceleration the operation of device 264 will have a torsional input force applied to input shaft 242 which will then be transmitted through transmission 226 to output shaft 246 which will then be transmitted through clutch 258, into shaft 248 through transmission 228 to output shaft 250 into input shaft 252, through transmission 230, to shaft 256, where the torsional force will go both to shaft 254 into transmission 225, and also through spur gear 234, which will mesh with gear 236, and force output/input shaft 232 to rotate with torsional force. Transmission 225 will also receive torsional force through input shaft 254, which force will then be transmitted through input shaft 238 to clutch 260 into shaft 262 which will force the rotation of gear 240 to mesh with gear 244, and turn shaft 242.

In deceleration of the automobile with which device 264 is mounted in, the operation will take place by a torsional input force being applied to output/input shaft 232, which causes the rotation of gear 236 to mesh with gear 234 which causes output shaft to rotate transmitting torsional force into input shaft 254 through transmission 225 to output shaft 238, through clutch 260 to shaft 262 which forces gear 240 to rotate and mesh with gear 244, which will cause input shaft 242 to rotate. This rotation will force whatever engine device is connected to shaft 242 to rotate. The engine at this point should be in a deceleration mode, in which case the engine will create drag which was discussed earlier. This engine drag will create a type of braking to the automobile with which the device 264 is mounted. The unidirectional clutches 260 and 258 are used in this device 264 to allow freewheeling to occur when necessary during different stages of operation of this compression braking transmission device.

In FIG. 6 is shown an embodiment of the compression braking device, in which there is a main case 268, which encloses the entire device. There is also an input shaft 270, and an output/input shaft 272, shown. These two shafts 270 and 272 are comparable in function to shafts 214 and 208*a* of compression braking device 220 in FIG. 5. Device 274 in FIG. 6 may have any configuration of the aforementioned transmission devices inside, but having only two input/output shafts 270 and 272. In other words device 274 simply is a way of encasing this compression braking transmission device.

It is to be understood that the above-described arrangements are only illustrative of the application of the principles of the present invention. Numerous modifications and alternative arrangements may be devised by those skilled in the art without departing from the spirit and scope of the present invention and the appended claims are intended to cover such modifications and arrangements.

What is claimed is:

1. A transmission device comprising:

a first rotational member configured for attachment to a means for rotating said first rotational member about a center of rotation;

a first translational member configured for transmitting force to a means for using said force;

connecting means for operatively connecting the first rotational member and the first translational member such that movement of one of said translation member and rotational member causes movement of the other of said translational member and rotational member, wherein a portion of the connecting means is pivotally connected to the first rotational member at a first radial attachment point removed from the center of rotation of said first rotational member such that said first radial attachment point and said center of rotation define a first attachment radius; and adjusting means for varying a location of the first radial attachment point responsive to rotational speed of the first rotational member to thereby increase and decrease the first attachment radius;

a second rotational member; and unidirectional clutch means for (i) engaging the second rotational member in rotational movement when the first rotational member rotates in a first rotational direction and (ii) releasing the second rotational member from engagement in rotational movement when said first rotational member rotates in a second, opposing rotational direction.

2. The transmission device of claim 1, wherein the adjusting means further comprises means for varying the location of the first radial attachment point during rotation of the first rotational member.

3. The transmission device of claim 1, wherein the first rotational member includes a perimeter defining an interior area, and wherein less than a majority of said interior area comprises an opening.

4. The transmission device of claim 1, wherein the first rotational member includes a moveable portion, and wherein the connecting means comprises a connecting arm, said connecting arm comprising a first portion and a second portion, wherein the second portion of the connecting arm is pivotally connected to said moveable portion, and wherein the adjusting means further comprises means for moving said moveable portion.

5. The transmission device of claim 3, wherein the first rotational member includes a first side and an opposing second side, the connecting arm being pivotally connected to the first side of said first rotational member, the transmission device further comprising:

a second translational member and a second connecting arm having a first portion pivotally connected to the second translational member and a second portion pivotally connected to the second side of the first rotational member at a second radial attachment point removed from the center of rotation of said first rotational member, such that said second radial attachment point and said center of rotation define a second attachment radius;

wherein the adjusting means further includes means for varying a location of the second radial attachment point to thereby increase and decrease the second attachment radius.

6. The transmission device of claim 5, further comprising:

a second rotational member and a third rotational member; and unidirectional clutch means for (i) engaging the second rotational member in rotational movement when the first rotational member rotates in a first rotational direction and (ii) releasing the second rotational member from engagement with the first rotational member when said first rotational member rotates in a second, opposing rotational direction, and (iii) engaging the third rotational member in rotational movement when the first rotational member rotates in the second, opposing rotational direction and (iv) releasing the third rotational member from engagement with the first rotational member when said first rotational member rotates in the first rotational direction.

7. The transmission device of claim 6, wherein the first and second radial attachment points are diametrically positioned to cause the first and second translational members to move in opposing directions.

8. The transmission device of claim 6, wherein the first and second radial attachment points define a first pivot axis and second pivot axis, respectively, and wherein the center of rotation of the first rotational member defines a center axis;

wherein positioning of the first pivot axis, second pivot axis and center axes is such that the first pivot axis and the second pivot axis are offset from the center axis by a first and second radial distance, respectively, and such that a first line connecting the first pivot axis with the center axis and a second line connecting the second pivot axis with the center axis define an approximately 180° angle about said center axis, such that said positioning cooperates with the unidirectional clutch means to cause reciprocating, back-and-forth rotational movement of the second rotational member and reciprocating, back-and-forth rotational movement of the third rotational member opposite in direction to the rotational movement of the second rotational member.

9. The transmission device of claim 8, wherein the adjusting means further includes means for maintaining the first radial distance substantially equivalent to the second radial distance.

10. The transmission device of claim 4, further comprising lengthening means for varying a length of the connecting arm.

11. The transmission device of claim 10:

wherein a reference member resides in a substantially fixed location with respect to a center of the first rotational force-transmitting member;

wherein the second force-transmitting member comprises a first translational member confined to a cycle of reciprocating linear movement toward and away from the reference member responsive to rotational movement of the first, rotational force-transmitting member, wherein the cycle of reciprocating linear movement is defined between a distal position and a proximal position of said first translational member;

wherein the adjusting means further comprises means for varying the length of the connecting arm sufficient to maintain the distal position of the cycle of reciprocating linear movement in substantially the same location with respect to the reference member.

12. The transmission device of claim 11, wherein the connecting arm and the lengthening means collectively comprise a male-threaded cylindrical member threadably engaged within a female-threaded sleeve, said male-threaded cylindrical member having a longitudinal axis and being rotatable with respect to the female-threaded sleeve about said longitudinal axis.

13. The transmission device of claim 1, wherein the first rotational member includes a movement piece having a female-threaded throughpassage formed therein, wherein the adjusting means further comprises:

mass means moveably disposed on the first rotational member for moving radially outwardly and inwardly along said first rotational member;

at least one male-threaded member rotatably disposed on the first rotational member and extending through the throughpassage of the movement piece threaded engagement therewith;

actuating means for rotating the male-threaded member responsive to radially-directed movements of the mass means along the first rotational member to thereby cause dynamic thread-to-thread engagement of said male-threaded member with female threads of the female-threaded throughpassage sufficient to cause radially-directed movement of the movement piece along the first rotational member, and thus variation in the location of the first radial attachment point with respect to the first rotational member.

14. The transmission device of claim 13, wherein the actuating means comprises:

gear teeth formed on the male-threaded member; and a gear body coupled to the mass means and extending outwardly therefrom, said gear body having gear teeth disposed in meshing engagement with the gear teeth on the male-threaded member.

15. The transmission device of claim 1, wherein movement of the first translational member and movement of the first rotational member define a first ratio of movement of said first rotational member to said first translational member, and wherein the adjusting means further comprises means for varying the location of the first radial attachment point without varying a location of the first pivot point relative to the first translational member to thereby change the first ratio of movement to a second ratio of movement.

16. The transmission device of claim 1, wherein the adjusting means further comprises means for continuously varying the location of the first radial attachment point to thereby continuously vary a first ratio of movement of the first rotational member to the first translational member.

17. The transmission device of claim 1, wherein the adjusting means comprises a hydraulic cylinder.

18. The transmission device of claim 1, wherein the translational member comprises an elongated rack gear having gear teeth arranged in a substantial linear orientation.

19. The transmission device of claim 18, wherein the rack gear comprises a first side and an opposing second side, and wherein the gear teeth extend outwardly from the first side such that the second side is characterized by an absence of gear teeth.

20. The transmission device of claim 1, further comprising:
a rotational gear member disposed in meshing engagement with the translational member.

21. The transmission device of claim 1, further comprising an engine cylinder, wherein the first translational member comprises a piston member slidably disposed within the engine cylinder.

22. The transmission device of claim 1, wherein the connection means comprises a first connection arm having a first portion pivotally connected to the first translational member at a first pivot point, and a second portion pivotally connected to the first rotational member at a first radial attachment point removed from the center of rotation of said first rotational member such that said first radial attachment point and said center of rotation define a first attachment radius.

23. The transmission device of claim 1, wherein the connection means comprises:
a first connecting arm having a first portion, and a second portion pivotally connected to the first rotational member; and
a second connecting arm having a first portion pivotally connecting to the first portion of the first connection arm, and an opposing second portion slidably connected to the first translational member;
wherein an interior portion of the second connecting arm is pivotally attached to a fulcrum point such that movement of the first portion of the second connecting arm in a first direction causes corresponding movement of the second portion of said second connecting arm in a second, opposing direction.

24. The transmission device of claim 23, wherein the second connecting arm is an elongate member defining an axial direction, said transmission device further comprising means for moving the fulcrum point along the axial direction of the second connecting arm to thereby modify a range of movement of said second connecting arm.

25. A transmission device comprising:
a first rotational member configured for attachment to a means for rotating said first rotational member about a center of rotation;
a first translational member configured for transmitting force to a means for using said force;
connecting means for operatively connecting the first rotational member and the first translational member such that movement of one of said translational member and rotational member causes movement of the other of said translational member and rotational member, wherein a portion of the connecting means is pivotally connected to the first rotational member at a first radial attachment point removed from the center of rotation of said first rotational member such that said first radial attachment point and said center of rotation define a first attachment radius; and
adjusting means (i) varying a location of the first radial attachment point responsive to rotational speed of the first rotational member to thereby increase and decrease the first attachment radius and (ii) maintaining said radius at a first, larger radial length responsive to a faster constant rotational speed of the first rotational member, and maintaining said radius at a second, shorter radial length responsive to a slower constant rotational speed of said first rotational member.

26. A transmission device comprising:
a first rotational member configured for attachment to a means for rotating said first rotational member about a center of rotation;
a first translational member configured for transmitting force to a means for using said force;
connecting means for operatively connecting the first rotational member and the first translational member such that movement of one of said translational member and rotational member causes movement of the other of said translational member and rotational member, wherein a portion of the connecting means is pivotally connected to the first rotational member at a first radial attachment point removed from the center of rotation of said first rotational member such that said first radial attachment point and said center of rotation define a first attachment radius; and
adjusting means (i) varying a location of the first radial attachment point responsive to rotational speed of the first rotational member to thereby increase and decrease the first attachment radius and (ii) maintaining said radius at a first, radial length responsive to a faster constant rotational speed of the first rotational member, and maintaining said radius at a second, different radial length responsive to a slower constant rotational speed of said first rotational member.

27. A transmission device comprising:
a circular wheel having the shape of a circle and being configured for attachment to a means for rotating said circular wheel about a center of rotation;
a first translational member configured for transmitting force to a means for using said force;
connecting means for operatively connecting the circular wheel and the first translational member such that movement of one of said translational member and circular wheel causes movement of the other of said translational member and circular wheel, wherein a portion of the connecting means is pivotally connected directly onto the circular wheel at a first radial attachment point removed from the center of rotation of said circular wheel such that said first radial attachment point and said center of rotation define a first attachment radius; and
adjusting means for alternately (i) holding the first radial attachment point at a fixed location on the wheel, with respect to the center of rotation of said wheel, during rotational movement of said wheel, such that the first radial attachment point is prevented from sliding freely with respect to said wheel, (ii) varying a location of the first radial attachment point on the wheel during rotational movement of said wheel to thereby increase and decrease the first attachment radius, and (iii) maintaining said first attachment radius at a first radial length responsive to a faster constant rotational speed of the circular wheel, and maintaining said radius at a second, different radial length responsive to a slower constant rotational speed of said circular wheel;
wherein all points on the wheel are confined to rotation on a fixed, circular movement path, and wherein the center of rotation of the wheel remains in a substantially fixed orientation with respect to the adjusting means.

* * * * *